March 3, 1970  L. MALCHIN  3,498,162
MICROMETRIC STOP ROD MECHANISM FOR MACHINE TOOLS
Filed Feb. 17, 1967  2 Sheets-Sheet 1

INVENTOR.
LEO MALCHIN
BY
Friedman & Goodman
ATTORNEYS

March 3, 1970 L. MALCHIN 3,498,162
MICROMETRIC STOP ROD MECHANISM FOR MACHINE TOOLS
Filed Feb. 17, 1967 2 Sheets-Sheet 2

INVENTOR.
LEO MALCHIN
BY
Friedman & Goodman
ATTORNEYS

_United States Patent Office_

3,498,162
Patented Mar. 3, 1970

3,498,162
MICROMETRIC STOP ROD MECHANISM
FOR MACHINE TOOLS
Leo Malchin, 525 Park Ave.,
New York, N.Y. 10021
Filed Feb. 17, 1967, Ser. No. 616,837
Int. Cl. B23b 3/36; G01b 3/18, 5/00
U.S. Cl. 82—34                              2 Claims

ABSTRACT OF THE DISCLOSURE

A stop rod mechanism for machine tools to be used in place of existing threaded stop rods, the spindle portion of the mechanism being mounted within a hollow micrometrically adjustable head mechanism for initial slideable axial movement and being capable of being locked in position with respect to said head for predetermined adjustment of the position of said spindle with micrometric accuracy.

BACKGROUND OF THE INVENTION

Field of the invention

This invention relates to stop mechanisms for machine tools wherein the movement of a machine part is arrested by abutment of a stop rod arrangement with another machine part.

Background of the invention

The invention is intended to solve the problem of positioning the stop rod mechanism associated with a machine tool in a predetermined manner to a high degree of accuracy.

SUMMARY OF THE INVENTION

Machine tools of various types have heretofore employed stop rods for the purpose of limiting the movement of appropriate parts with respect to the machine. Such stop rods have usually been threaded throughout their length and have been adjusted by rotation within a complementary threaded bore. It has heretofore been difficult to pre-position such bar with any degree of accuracy either for the purpose of initially setting up the machine or for accurately cutting or finishing the workpiece. This has resulted in the requirement of using trial and error by the operator in connection with such adjustment.

It is therefore among the objects of this invention to provide a stop rod mechanism which may be accurately pre-set to the desired adjustment of position within micrometric limits. This is accomplished by the provision of a freely movable stop spindle within a hollow micrometrically adjustable head. The axially movable spindle is locked in position after initial sliding adjustment and is then rendered additionally adjustable in accordance with the adjustment of the micrometric head as required. By locking the spindle in position in the micrometric head, the length of movement of the slide or the like is predetermined and by additional adjustment of the thimble, the work to be performed is precisely predetermined. There is thus provided an automatic stop mechanism for a machine tool such as for example, a turret lathe wherein quick and automatic adjustment of the stop means is accomplished, thus eliminating trial and error methods commonly used in setting up and finishing the workpiece.

BRIEF DESCRIPTION OF THE INVENTION

Figure 1:
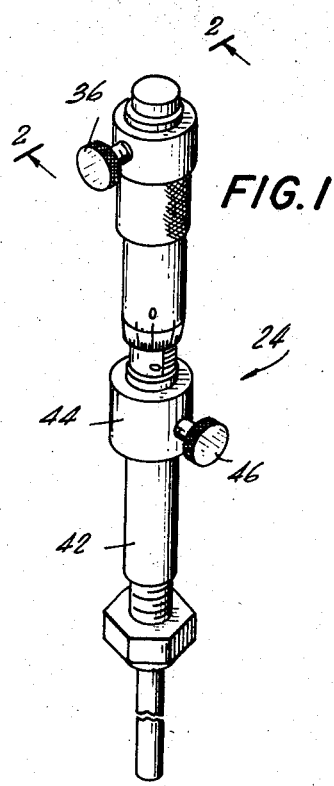
FIGURE 1 is a perspective view of a stop rod or bar mechanism pursuant to the present invention.
Figure 2:
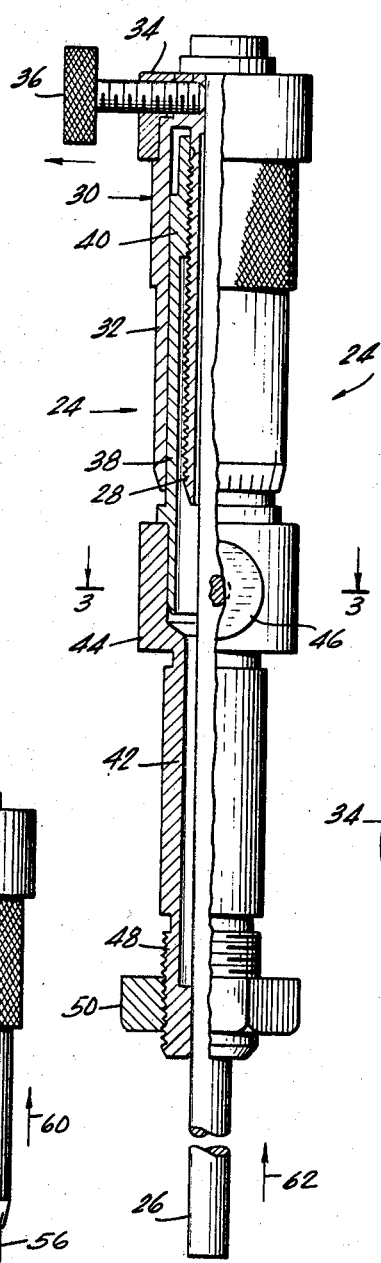
FIGURE 2 is a sectional view on an enlarged scale taken on the line 2—2 of FIGURE 1.
Figure 3:
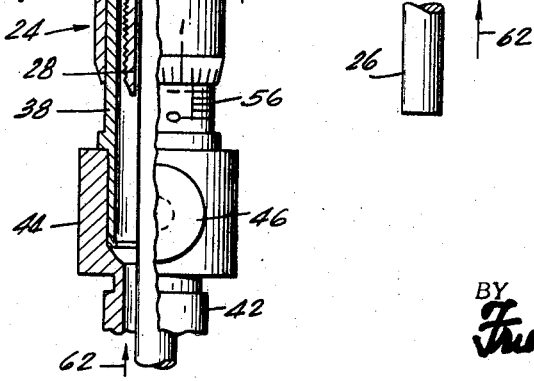
FIGURE 3 is a sectional view taken on the line 3—3 of FIGURE 2.
Figure 4:
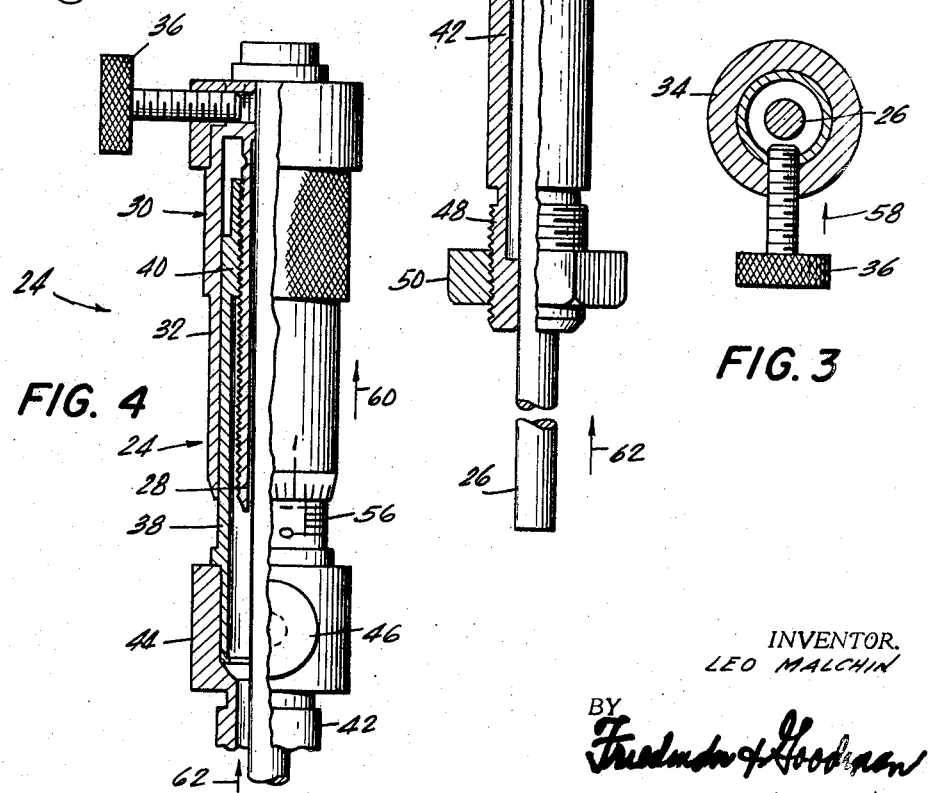
FIGURE 4 is a fragmentary view similar to FIGURE 2 and illustrates the parts in another condition thereof.
Figure 5:
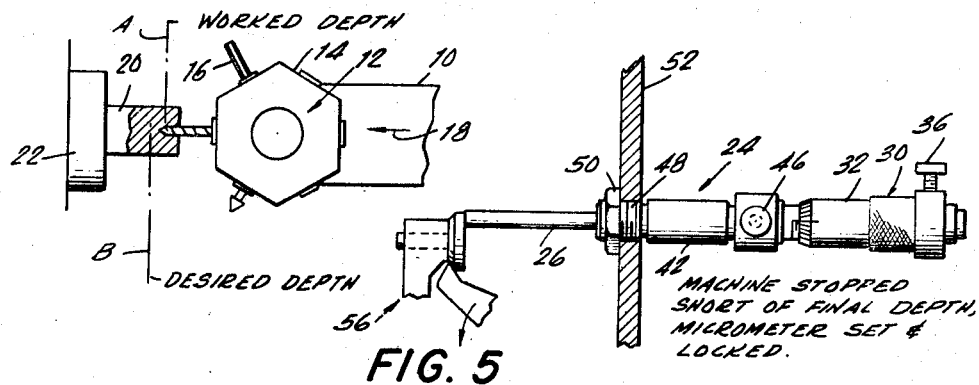
FIGURE 5 and FIGURE 6 are more or less diagrammatic illustrations which show the operation of the stop rod mechanism of the present invention.
Figure 6:
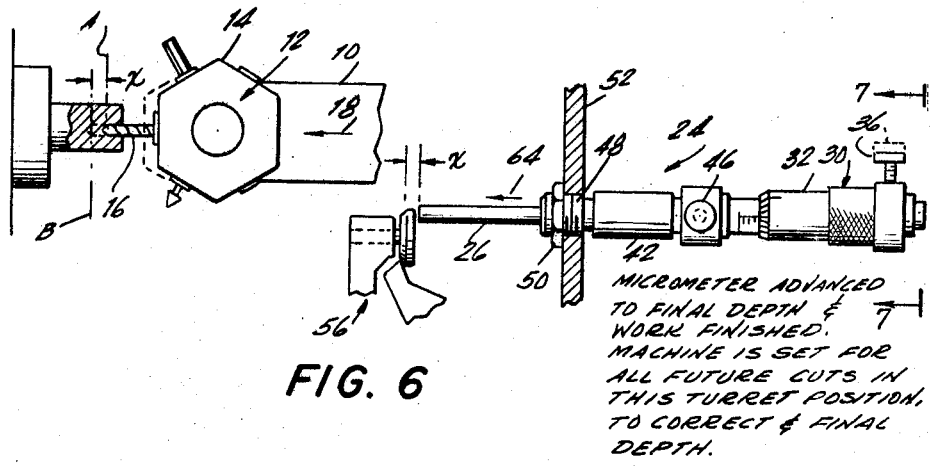
Figure 7:
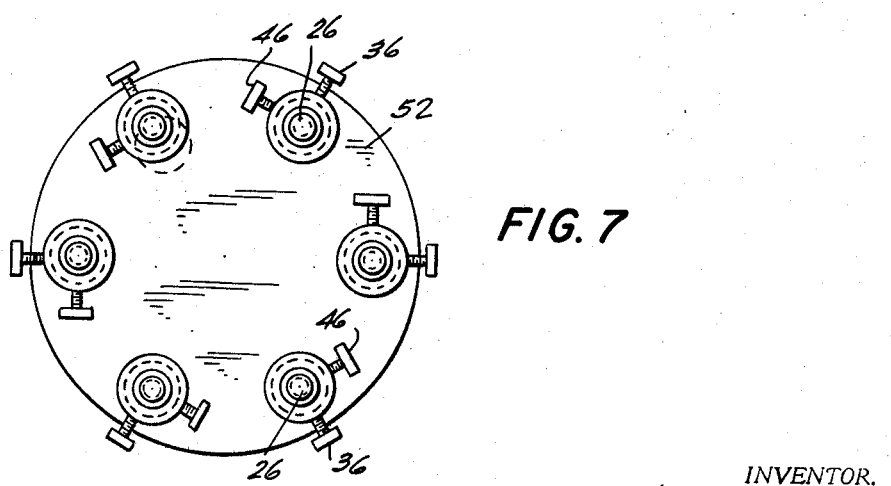
FIGURE 7 is a view taken in the direction of the lines 7—7 of FIGURE 6.

Referring now to FIGURES 5 and 6 of the drawing in detail, the reference numeral 10 represents the slide of a conventional turret lathe. The slide 10 mounts a conventional turret 12 which, as here shown, is provided with six faces or facets 14 on each of which there is mounted a tool 16. As is well known to those skilled in the art, the slide is movable from a retracted position thereof in the direction of the arrow 18 to move a tool 16 on one of the faces 14 into engagement with a workpiece 20 suitably mounted in a work-holder 22 to provide a work operation on the workpiece. When the operation has been completed, the slide can be retracted in a direction opposite that of the direction of the arrow 18 and the turret can then be rotated to bring another tool into position for operation on the workpiece 20.

It is well known to provide an automatic stop mechanism for the turret lathe which includes as many adjustable stops rods 24 as there are faces 14 to the turret. The present invention is directed toward a highly novel stop rod means or mechanism which eliminates the trial and error methods utilized in the prior art in setting up a machine of this type and therefore provides a more efficient operation.

Referring now to FIGURES 1 through 4 in detail, there is shown a stop rod mechanism or means 24 pursuant to the present invention. The stop rod mechanism 24 comprises a spindle or rod 26 which is mounted within a hollow micrometer screw 28. The micrometer screw 28 represents the inner portion of a thimble which is generally indicated by the reference numeral 30. The thimble 30 is provided also with a thimble sleeve 32 which is integral with and concentrically envelops the screw 28. The thimble is provided also with a thimble cap 34. It will be understood that the spindle or rod 26 is movable relative to the thimble 30 but can be fixed in position with respect thereto by means of a locking bolt 36 which can be threaded through the thimble cap 34 so as to engage the spindle 26.

The stop nut mechanism 24 also includes a barrel 38 having an internally threaded fixed nut portion 40 which is in threaded engagement with the externally threaded micrometer screw 28. The barrel 38 is provided with a barrel extension 42. The barrel extension 42 has an enlarged hub 44 in which the barrel 38 is received. The hub is releasably secured to the barrel 38 by means of a locking bolt 46. The barrel 42 is provided with an integral mounting screw portion 48 which is adapted to receive a locking nut 50. As best shown in FIGURES 5 and 6, the amounting screw 48 is threadedly engaged into a suitable mounting plate 52 provided on the turret lathe and the locking nut 30 is then utilized to lock the stop rod mechanism 24 in the mounting plate. The sleeve 32 of the thimble 30 is provided with a beveled edge 54 which carries graduations to enable readings to be taken. The barrel 38 is also provided with graduations indicated by the reference numeral 56 which are in a line parallel to the axis of the micrometer screw 28 and conform to the pitch of the screw. The stop rod mechanism 24 is adjusted for its associated tool 16. More specifically and viewing FIGURES 5 and 6, it will be noted that the stop rod mechanism 24 is adjusted for the tool 16 which is in position to operate on the workpiece 20. The spindle 26 is adjusted to extend for a pre-determined amount or distance forwardly from the mounting plate 52 so as to strike a conventional knockout mechanism 56, when the tool 16 has penerated the workpice 20 to the worked depth indicated by the reference A. The spindle 26 may be originally set at the required distance by engaging the lock bolt 36 with the spindle 26 by moving the lock bolt in the direction of the arrow 58 in FIGURE 3 with the spindle thus locked to the thimble, the thimble may then be rotated so that the micrometer screw 28 is rotated against the fixed nut portion 40 with which it is threadedly engaged whereby to move the thimble in a desired direction so as to project for the desired distance outwardly of the mounting plate 52. Consequently, when the spindle which is in operative position is properly adjusted when the associated tool 16 has reached the worked depth A, the spindle will engage the knockout mechanism 56. As a result, the turret slide 10 is disconnected in conventional manner from the mechanism for sliding it. The mechanism may now be adjusted in a simple manner os as to provide for penetration of the tool 16 from the worked depth A to the desired depth B shown in FIGURE 5. The distance between the position A and the position B is indicated by the distance X in FIGURE 6. The stop rod mechanism 24 may now be adjusted for this distance X. This may be readily accomplished by first retracting the locking bolt 36 to disengage the spindle 26 by moving the locking bolt from the full line to the broken line position thereof shown in FIGURE 6. With the spindle 26 remaining in abutment with the knockout mechanism 56, the thimble 30 is adjusted to provide a preferably zero reading on the micrometer scale 56. When the zero reading has been accomplished, the locking bolt 36 is locked in position. The distance X is now determined and the barrel 30 is rotated to move the barrel in the direction of the arrow 60 in FIGURE 4 to provide a reading on the micrometer scale 56 which is equal to the distance X. It will be readily apparent that said adjustment of the micrometer thimble 30 will result in a movement of the spindle 26 in the direction of the arrow 62 for the distance indicated on the micrometer reading 56 which, as indicated, is equal to the distance X. This will withdraw or retract the spindle 26 from the knockout mechanism 56 for the distance X as indicated in FIGURE 6. The turret lathe may now be operated again in the direction of the arrow 18 so that the spindle 26 will advance in the direction of the arrow 64 in FIGURE 6 only for the distance X at which time the spindle will engage the knockout mechanism 56 to disconnect the turret slide from the mechanism for sliding it. However, it will be noted from FIGURE 6 that the advance of the spindle for the distance X has caused the turret 12 to advance from the full line to the broken line position thereof illustrated in FIGURE 6 and consequently, to advance the tool 16 in the workpiece 20 for the distance X to the desired depth of penetration in the workpiece.

In view of the foregoing, it will be apparent that there has been illustrated and described a highly novel micrometrically adjustable stop rod mechanism for a turret lathe machine or the like.

It will be understood that various changes and modifications may be made within the present invention without, however, departing from the basic inventive aspect thereof as set forth in the appended claims.

I claim:

1. A stop rod mechanism for machine tools for limiting the movement of parts of the machine tool with respect to a workpiece, said mechanism comprising a thimble, a barrel mounted within said thimble, said thimble and barrel being in threaded engagement for relative movement, a spindle mounted for free relative axial movement within said thimble, and means to releasably lock said spindle to said thimble for movement therewith so as to micrometrically position the spindle by means of the adjustment setting of said thimble, a barrel extension provided on said barrel, means to releasably lock said barrel and said extension together, said barrel extension having a mounting screw portion.

2. An adjustable stop assembly as in claim 1, and a mounting plate in which said mounting screw is threadably engaged.

References Cited

UNITED STATES PATENTS 2,559,311   7/1951   Meissner.
2,611,967   9/1952   Bennett _____ 33—165

LEONIDAS VLACHOS, Primary Examiner

U.S. Cl. X.R.

33—165